United States Patent

Yonezawa

(10) Patent No.: US 9,833,866 B2
(45) Date of Patent: Dec. 5, 2017

(54) CLAMP DEVICE

(71) Applicant: KOSMEK LTD., Kobe-shi, Hyogo (JP)

(72) Inventor: Keitaro Yonezawa, Kobe (JP)

(73) Assignee: KOSMEK LTD., Kobe-Shi, Hyogo (JP)

(*) Notice: Subject to any disclaimer, the term of this patent is extended or adjusted under 35 U.S.C. 154(b) by 123 days.

(21) Appl. No.: 14/408,450

(22) PCT Filed: Aug. 2, 2013

(86) PCT No.: PCT/JP2013/004710
§ 371 (c)(1),
(2) Date: Dec. 16, 2014

(87) PCT Pub. No.: WO2014/024457
PCT Pub. Date: Feb. 13, 2014

(65) Prior Publication Data
US 2015/0202726 A1    Jul. 23, 2015

(30) Foreign Application Priority Data

Aug. 9, 2012 (JP) .................................. 2012-177242

(51) Int. Cl.
B25G 3/18 (2006.01)
F16B 21/00 (2006.01)
(Continued)

(52) U.S. Cl.
CPC .............. B23Q 3/082 (2013.01); B23Q 3/06 (2013.01); B25B 5/064 (2013.01); Y10T 403/602 (2015.01)

(58) Field of Classification Search
CPC ........... Y10T 403/602; Y10T 403/7041; Y10T 403/60; B23Q 3/06; B23Q 3/069;
(Continued)

(56) References Cited

U.S. PATENT DOCUMENTS 1,888,068 A * 11/1932 Brown .................... H01J 19/36
174/127
2,726,060 A * 12/1955 Elsner ...................... F16B 2/04
24/635
(Continued)

FOREIGN PATENT DOCUMENTS

EP        0402680 A1    12/1990
GB        2195886 A  *   4/1988   ............... A47B 9/16
(Continued)

OTHER PUBLICATIONS

European Office Action dated Jan. 15, 2016, for EP 13828744.
(Continued)

Primary Examiner — Abigail Troy
Assistant Examiner — Nahid Amiri
(74) Attorney, Agent, or Firm — Bacon & Thomas, PLLC

(57) ABSTRACT

An output part is provided to the left end of a clamp arm that is supported by a housing so as to be slidable in the vertical direction. At the left end of the housing, a first hole for spring fitting opens obliquely upward towards the output part. A through hole that links the upper surface and the lower surface of the clamp arm is disposed obliquely upward at a left-leaning part of the clamp arm. A second hole for spring fitting and a female screw hole are formed, in that order, upwards in the through hole. A return spring that is installed through the first hole and the second hole impels the output part upwards. A push bolt that is screwed into the female screw hole rom above compresses the return spring.

6 Claims, 5 Drawing Sheets

(51) Int. Cl.
*F16D 1/00* (2006.01)
*B23Q 3/08* (2006.01)
*B25B 5/06* (2006.01)
*B23Q 3/06* (2006.01)

(58) Field of Classification Search
CPC . B23Q 3/082; B23Q 1/25; B23Q 1/26; B23Q 1/621; B23Q 2703/00; B25B 5/064; B25B 5/122; A47F 5/025; B21D 37/02
USPC ...... 403/322.4; 108/20, 97, 98, 143; 269/32, 269/33, 34, 99, 234, 238; 296/32, 33, 34, 296/99, 234, 238
See application file for complete search history.

(56) References Cited

U.S. PATENT DOCUMENTS

| | | | | | |
|---|---|---|---|---|---|
| 4,189,953 | A | * | 2/1980 | Volk | B23Q 1/621 108/143 |
| 4,721,293 | A | * | 1/1988 | Schron | B25B 5/087 269/234 |
| 5,205,222 | A | * | 4/1993 | Bernard | D06F 79/02 108/42 |
| 5,377,598 | A | * | 1/1995 | Kirchner | A47B 21/03 108/137 |
| 5,555,875 | A | * | 9/1996 | Martin | F41B 5/143 124/24.1 |
| 6,096,956 | A | * | 8/2000 | Hoshino | G10D 13/00 84/421 |
| 6,371,467 | B1 | * | 4/2002 | Nishimoto | B25B 5/064 269/32 |
| 6,736,383 | B2 | * | 5/2004 | Kohlert | B25B 5/064 269/234 |
| 7,556,449 | B2 | * | 7/2009 | Sasaki | B60R 13/06 403/321 |
| 8,240,257 | B2 | * | 8/2012 | Frost | A47B 9/00 108/147 |
| 8,985,032 | B1 | * | 3/2015 | Johnson | A47B 21/02 108/106 |

FOREIGN PATENT DOCUMENTS

| | | |
|---|---|---|
| JP | 55-024841 A | 2/1980 |
| JP | 01-240241 A | 9/1989 |
| JP | H08-177814 A | 7/1996 |

OTHER PUBLICATIONS

International Search Report (ISR) dated Sep. 17, 2013, for PCT/JP2013/004710, and English translation thereof.
Microfilm of the specification and drawings annexed to the request of Japanese Utility Model Application No. 22765/1990 (Laid-open No. 91127/1991), Sep. 17, 1991.

* cited by examiner

CLAMP DEVICE

TECHNICAL FIELD

The present invention relates to a clamp device which fixes an object to be fixed such as a mold or a workpiece to a support stand such as a table, and more specifically relates to a clamp device of a type in which a middle portion of a clamp arm in a longitudinal direction thereof is swingably supported.

BACKGROUND ART

As such a type of conventional clamp device, there is a clamp device disclosed in Patent Literature 1 (Japanese Laid-Open Patent Publication No. H08-177814). The clamp device of the conventional art is configured as follows.

A middle portion of a clamp arm in a longitudinal direction thereof is mounted on a housing (clamp arm receiving stand) via a fulcrum shaft so as to be swingable in an up-down direction. A leading end portion of the clamp arm is provided with an output portion (working point) which presses an object to be fixed, and a rear end portion of the clamp arm is provided with an input portion (power point) which is pressed up by a piston.

A first hole for mounting a spring is formed at the leading end side of the housing so as to be opened obliquely upward toward a leading end-adjacent portion of the clamp arm. In addition, a second hole for mounting a spring is formed at the leading end side of the clamp arm so as to be opened obliquely downward toward the first hole. A return spring for returning the clamp arm is installed in the first hole and the second hole.

In fixing the object to be fixed by means of the conventional clamp device, a pressure fluid is supplied into a working chamber located at the lower side of the piston. Accordingly, the input portion of the clamp arm is pressed up by the piston, the clamp arm swings, and the output portion presses the object to be fixed. In this lock state, the return spring is compressed between the housing and the clamp arm.

In return-driving the clamp device from the lock state to a release state, the pressure fluid in the working chamber is discharged therefrom. Accordingly, the output portion of the clamp arm is pressed up by a biasing force of the return spring, and the input portion of the clamp arm presses down the piston. Thus, the lock state of the object to be fixed is released.

[PTL 1] Japanese Laid-Open Patent Publication No. H08-177814

SUMMARY OF THE INVENTION

In the above-described conventional art, since the return spring for returning the clamp arm is installed so as to be tilted, it is possible to increase an arm length between the fulcrum shaft and a location at which the biasing force of the return spring is applied to the clamp arm. Thus, the return spring is allowed to increase a rotary force thereof with respect to the clamp arm to immediately return the clamp arm. However, with the conventional clamp device, there is room for improvement in assembling or maintenance as follows.

Specifically, in the above-described conventional art, in order to further immediately return-drive the clamp arm, a return spring having a great biasing force is required. In the case where such a powerful return spring is used, in assembling or maintenance of the clamp device, a working operation using a special tool is required in order to mount or dismount the return spring in or from the first hole and the second hole for mounting a spring. Thus, the assembling or maintenance of the clamp device takes much time and labor.

An object of the present invention is to allow a powerful spring to be used as a return spring for a clamp arm and also allow the powerful spring to easily be mounted and dismounted.

In order to attain the above object, according to the present invention, a clamp device is configured as follows, for example, as shown in FIGS. 1 to 5.

A clamp arm 14 extending along a housing 12 in a horizontal direction includes a fulcrum portion 14a which is swingably supported by the housing 12 at a middle portion in the horizontal direction, an input portion 14b which is provided at a base end thereof in the horizontal direction, and an output portion 14c which is provided at a leading end thereof in the horizontal direction. A cylinder hole 16 is formed in the housing 12 and below the input portion 14b so as to extend in an up-down direction and be opened in an upper surface of the housing 12. A piston 18 is inserted into the cylinder hole 16 and configured to advance to above an opening end of the housing 12 to move the input portion 14b upward. A working chamber 20 which a pressure fluid is supplied into and discharged from is formed between a bottom wall 16a of the cylinder hole 16 and the piston 18. A first hole 22 for mounting a spring is formed near a leading end portion of the housing 12 so as to be opened obliquely upward toward a leading end-adjacent portion of the clamp arm 14. A through hole 24 is provided between the output portion 14c and the fulcrum portion 14a so as to extend obliquely upward and provide communication between an upper surface and a lower surface of the clamp arm 14. A second hole 24a for mounting a spring and a female screw hole 24b are formed in the through hole 24 in this order so as to extend upward. A return spring 26 is mounted in the first hole 22 and the second hole 24a and biases the output portion 14c upward. A pressing bolt 28 is screwed into the female screw hole 24b from above and compresses the return spring 26.

The present invention exerts the following advantageous effects.

In assembling the clamp device, when the return spring is mounted on the clamp arm, first, the return spring in a free state is disposed between the first hole of the housing and the second hole of the clamp arm. Next, the pressing bolt is screwed into the female screw hole from above and rotated to be fastened to compress the return spring. Thus, the mounting of the return spring is completed. In addition, in disassembling the clamp device, the pressing bolt is rotated relative to the female screw hole to be loosed, thereby returning the return spring from the compressed state described above to the free state or a state close to the free state. Thus, it is possible to easily dismount the return spring from the first hole and the second hole.

As described above, in assembling or disassembling the clamp device, the return spring is caused to come into the free state or a state close to the free state, whereby it is possible to make a biasing force thereof zero or decrease the biasing force. Thus, unlike the conventional art described above, a special tool for mounting and dismounting the return spring is unnecessary. As a result, in assembling or maintenance of the clamp device, it does not take much time and labor to mount or dismount the return spring. In addition, it is also possible to use a powerful spring as the return spring.

In the present invention, preferably, at least an upper half portion of the cylinder hole 16 is formed so as to extend straight in the up-down direction; and at least an upper half portion of the piston 18 is formed so as to extend straight in the up-down direction.

In this case, it is possible to efficiently produce the cylinder hole of the housing and the piston.

In addition, in each invention described above, an inclination angle θ of an axis C2 of the first hole 22 with respect to an axis C1 of the cylinder hole 16 is set preferably within a range of 30 degrees to 45 degrees and more preferably within a range of 35 degrees to 45 degrees.

Furthermore, in the present invention, it is preferred to add a specific configuration described in an embodiment described later.

DETAILED DESCRIPTION OF THE INVENTION

Figure 1:
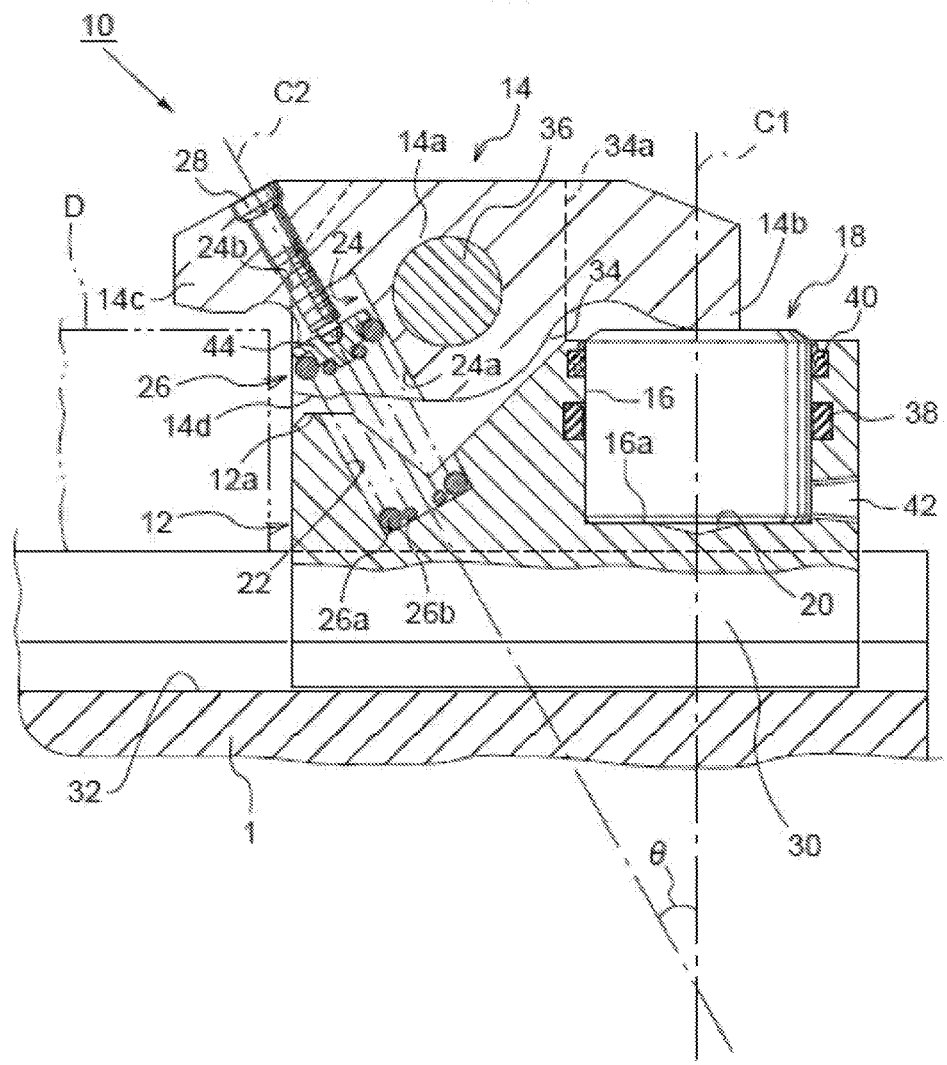
FIG. 1 is a cross-sectional elevation view of a release state in a clamp device according to an embodiment of the present invention.

Hereinafter, an embodiment of the present invention will be described with reference to FIGS. 1 to 5. First, the structure of a clamp device 10 will be described with reference to FIGS. 1 to 4 showing a release state prior to fixing an object to be fixed.

The clamp device 10 according to the present invention is mounted on a support stand 1 such as a table when being used. A T-leg 30 is formed at a lower portion of a housing 12 and fitted into a T-groove 32 formed in the support stand 1, so as to be movable in a horizontal direction (a right-left direction in FIG. 1).

Figure 2:
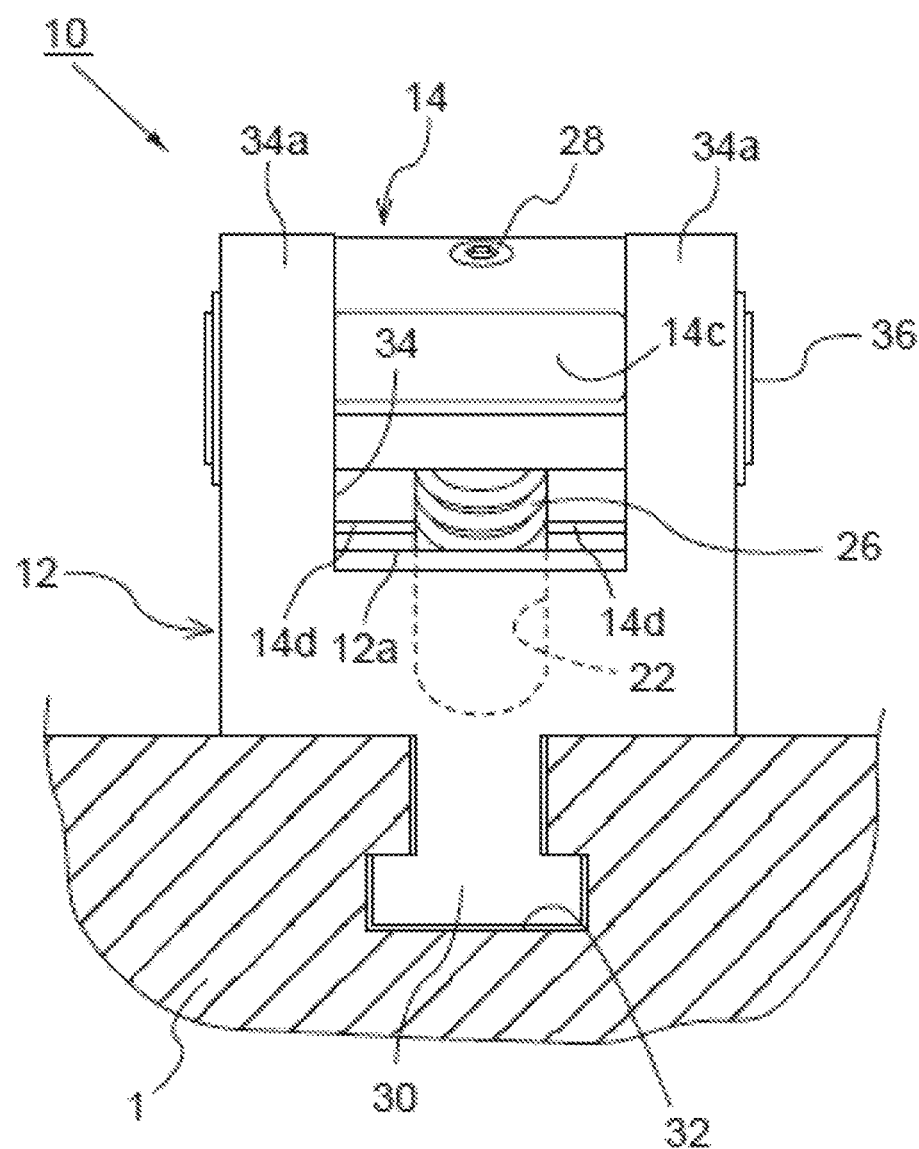
FIG. 2 is a left side view of the clamp device shown in FIG. 1.
Figure 3:
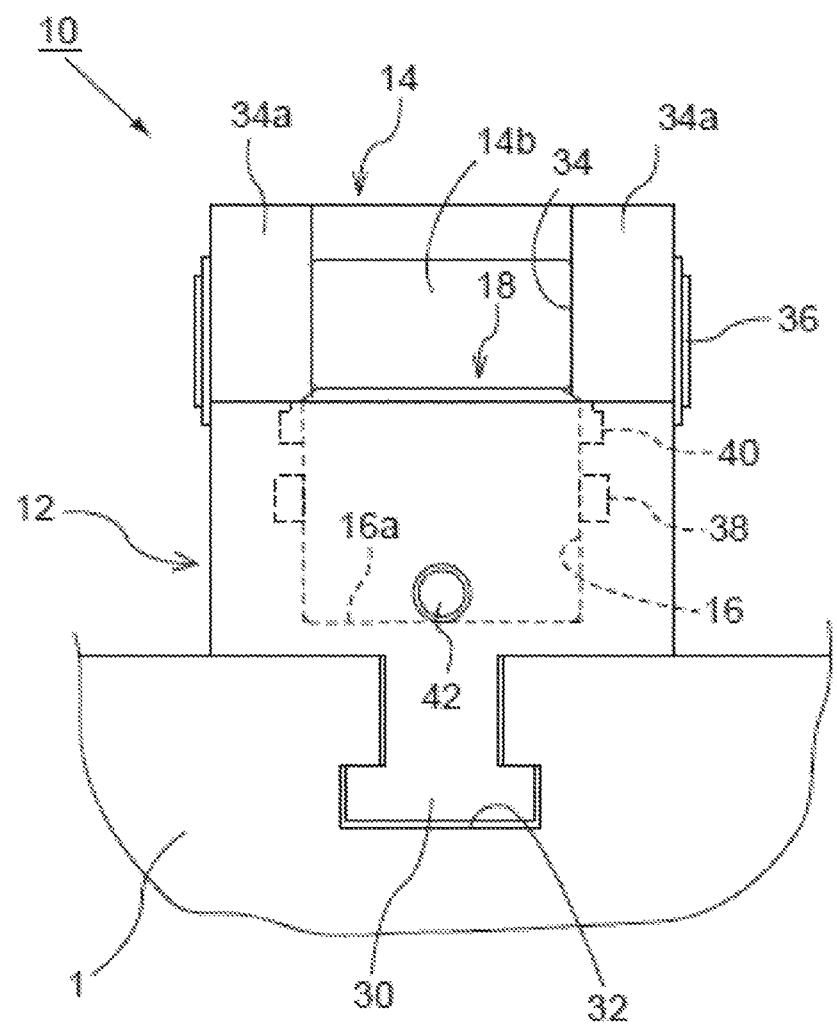
FIG. 3 is a right side view of the clamp device shown in FIG. 1.
Figure 4:
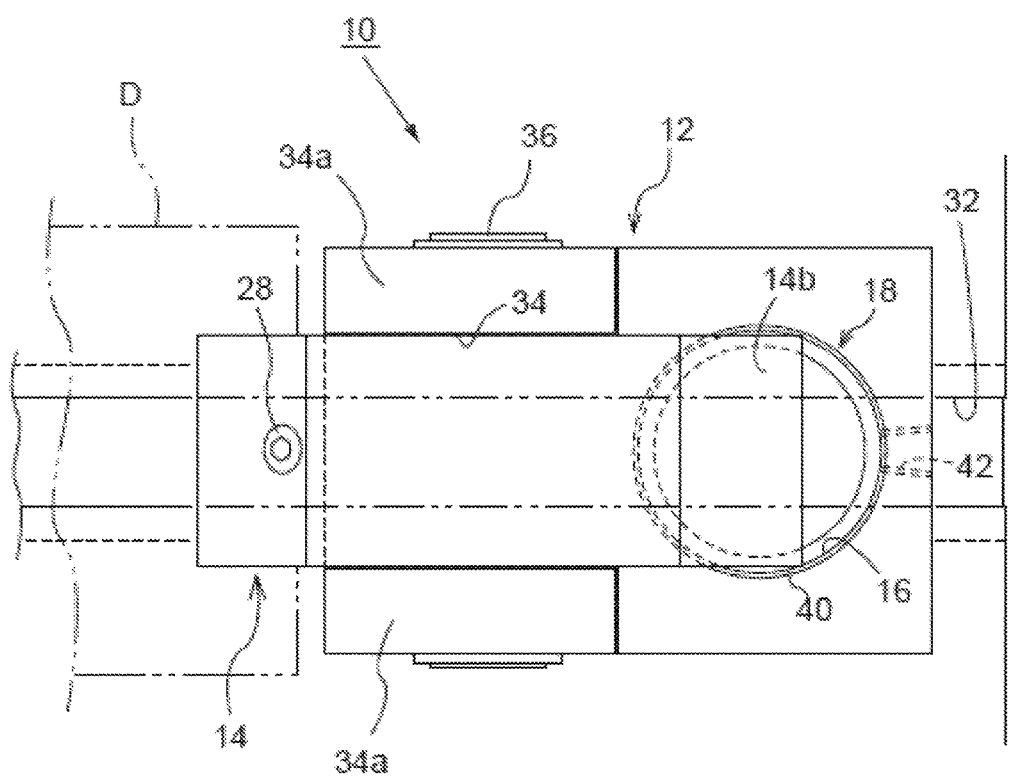
FIG. 4 is a plan view of the clamp device shown in FIG. 1.

At the left end side (leading end side) of the housing 12 in FIG. 1, a pair of right and left side walls 34a are provided in a standing manner as shown in FIG. 2. A groove 34 having a U shape in a side view is formed between the side walls 34a. A pivotal support shaft 36 is provided to both side walls 34a and at a middle portion of the housing 12 in the right-left direction, and a fulcrum portion 14a provided at a middle portion of a clamp arm 14 in a longitudinal direction thereof is rotatably supported by the pivotal support shaft 36. In addition to the fulcrum portion 14a, the clamp arm 14 includes: an input portion 14b which is provided at the right end side (base end side) of the clamp arm 14; and an output portion 14c which is provided at the left end side (leading end side) of the clamp arm 14.

Meanwhile, at the right end side (base end side) of the housing 12 in FIG. 1, a cylinder hole 16 is formed at a position corresponding to the input portion 14b so as to be opened in an upper surface of the housing 12 and extend straight over the entirety thereof in an up-down direction. A piston 18 is hermetically inserted into the cylinder hole 16 via a sealing member 38. The piston 18 is formed so as to extend straight over the entirety thereof in the up-down direction, and advances to above the opening end of the cylinder hole 16 to move the input portion 14b upward. In addition, a scraper 40 is mounted at an opening edge portion of the cylinder hole 16.

A working chamber 20 is formed between the piston 18 and a bottom wall 16a of the cylinder hole 16. A pressure oil as a pressure fluid is supplied into or discharged from the working chamber 20 through a supply/discharge port 42.

A first hole 22 for mounting a spring is formed near a left end portion of the housing 12 so as to be opened obliquely upward toward a left end-adjacent portion of the clamp arm 14. An inclination angle θ of an axis C2 of the first hole 22 with respect to an axis C1 of the cylinder hole 16 is set preferably within a range of 30 degrees to 45 degrees and more preferably within a range of 35 degrees to 45 degrees. When the inclination angle θ is set within such a range, an arm length between an axis of the pivotal support shaft 36 and a location at which a biasing force of a later-described return spring 26 is applied to the clamp arm 14, is increased. Thus, the return spring 26 is allowed to increase a rotary force with respect to the clamp arm 14. As a result, it is possible to further rapidly return-drive the clamp arm 14 without increasing the size of the housing 12, the return spring 26, or the like.

Meanwhile, a through hole 24 is formed in the clamp arm 14 and between the output portion 14c and the fulcrum portion 14a so as to extend obliquely upward and provide communication between an upper surface and a lower surface of the clamp arm 14. The through hole 24 is provided so as to be substantially coaxial with the axis C2 of the first hole 22 in the release state. A second hole 24a for mounting a spring and a female screw hole 24b are formed in the through hole 24 in this order so as to extend upward. As described later, the return spring 26 is mounted in the first hole 22 and the second hole 24a in a free state, and is compressed by a pressing bolt 28 screwed into the female screw hole 24b from above, thereby biasing the output portion 14c upward. It should be noted that in order to prevent the pressing bolt 28 from being loosed, the pressing bolt 28 is preferably rotated to be fully fastened.

In addition, a projection 14d formed on a left end side lower surface of the clamp arm 14 and a left end side upper surface 12a formed in the housing 12 so as to receive the projection 14d serve as a stopper which prevents the piston 18 from coming out of the cylinder hole 16.

The return spring 26 includes: an outer spring 26a which has a large diameter; and an inner spring 26b which has a small diameter and is inserted into the outer spring 26a. Each of the outer spring 26a and the inner spring 26b is composed of a compression coil spring. A lower end portion of the return spring 26 is received by a bottom wall of the first hole 22 of the housing 12. An upper end portion of the return spring 26 is received by the pressing bolt 28 via a spring receiver 44 inserted into the second hole 24a of the clamp arm 14.

Figure 5:
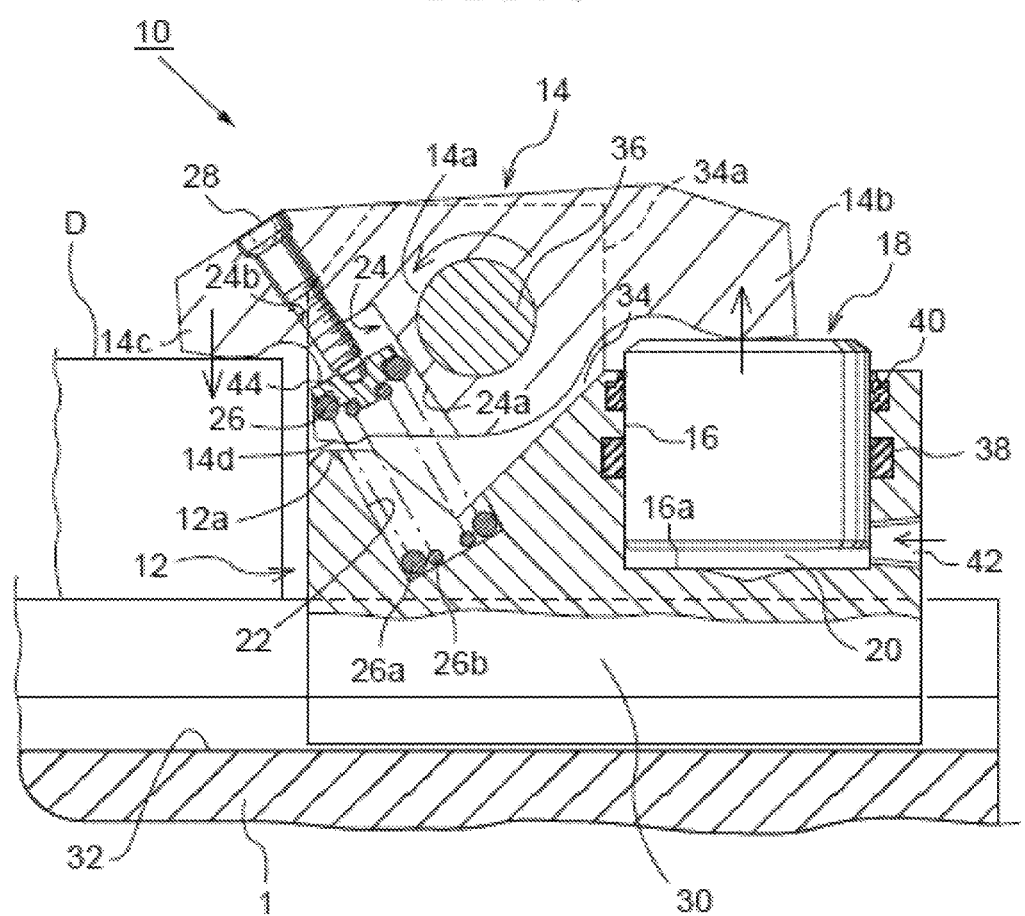
FIG. 5 is a cross-sectional elevation view showing a lock state of the clamp device.

As shown in FIGS. 1 and 5, the clamp device 10 having the above configuration operates as follows.

In the release state of FIG. 1, the pressure oil in the working chamber 20 is discharged therefrom, and the output portion 14c of the clamp arm 14 is pressed up and the input portion 14b is pressed down by the biasing force of the return spring 26, thereby moving the piston 18 downward.

In lock-driving the clamp device 10, the pressure oil is supplied into the working chamber 20 in the release state of FIG. 1.

Accordingly, as shown in FIG. 5, the pressure oil in the working chamber 20 moves the piston 18 upward, the piston 18 presses up the input portion 14b of the clamp arm 14, and the output portion 14c is pressed down against the return spring 26. Thus, the output portion 14c presses a mold D against an upper surface of the support stand 1.

In switching the clamp device 10 from the lock state of FIG. 5 to the release state of the FIG. 1, the pressure oil in the working chamber 20 is discharged therefrom in FIG. 5 described above.

Accordingly, the output portion 14c of the clamp arm 14 is pressed up by the biasing force of the return spring 26, and the input portion 14b moves the piston 18 downward, thereby returning to the release state of FIG. 1. Thus, fixing of the mold D is released.

The clamp device 10 according to the embodiment described above has the following advantages.

In assembling or disassembling the clamp device 10, when the clamp arm 14 is mounted in or dismounted from the groove 34 of the housing 12, the pressing bolt 28 is rotated to be loosed to decrease the biasing force of the return spring 26, thereby allowing the pivotal support shaft 36 to easily be inserted into or pulled out from the housing 12.

In addition, since the stopper for the piston 18 is composed of the projection 14d provided on the left end side lower surface of the clamp arm 14 and the left end side upper surface 12a of the housing 12 which is formed so as to receive the projection 14d, it is unnecessary to provide a stopper portion at an upper portion of the cylinder hole 16. Thus, it is possible to simplify the structure of the cylinder hole 16 or the piston 18. As a result, the clamp device 10 is excellent in productivity and maintainability.

Moreover, by changing the machining dimensions of either one of the projection 14d on the left end side lower surface of the clamp arm 14 or the left end side upper surface 12a of the housing 12, it is possible to handle pistons 18 having various strokes. Thus, it is possible to share components. As a matter of course, the machining dimensions of both the projection 14d on the left end side lower surface of the clamp arm 14 and the left end side upper surface 12a of the housing 12 may be changed.

The embodiment described above can be changed as follows.

The pressure fluid which is supplied into or discharged from the working chamber 20 is not limited to the exemplified pressure oil, and may be compressed air, another compressed gas, or the like.

Although the clamp device 10 is not equipped with moving means, positioning means, and the like, the clamp device 10 may be reciprocated between a predetermined advance position and a predetermined retreat position on the support stand 1 by an actuator such as an electric motor or a hydraulic cylinder.

The case has been shown in which a dual spring composed of the outer spring 26a and the inner spring 26b is used as the return spring 26. However, for example, the return spring 26 may be composed of a single spring.

In addition, the case has been shown in which the spring receiver 44 is mounted at the upper end of the return spring 26. However, in the case where the return spring 26 can be compressed by only the pressing bolt 28, it is possible to omit the spring receiver 44.

In the embodiment described above, the case has been shown in which as a mounted attitude of the clamp device 10, the longitudinal direction of the clamp arm 14 is directed in the horizontal direction. However, the longitudinal direction of the clamp arm 14 may be directed in a vertical direction or an oblique direction.

In addition, the case has been shown in which the clamp device 10 is movably mounted on the support stand 1 by means of the T-leg 30 and the T-groove 32. However, a manner in which the clamp device 10 is mounted on the support stand 1 is not limited thereto, and the clamp device 10 may be fixed to the support stand 1 by means of a bolt.

The case has been shown in which the cylinder hole 16 and the piston 18 are formed so as to extend straight over the entirety thereof in the up-down direction. However, at least of an upper half portion of each of the cylinder hole 16 and the piston 18 may be formed so as to extend straight in the up-down direction.

DESCRIPTION OF THE REFERENCE CHARACTERS 10 clamp device
12 housing
14 clamp arm
14a fulcrum portion of clamp arm 14
14b input portion of clamp arm 14
14c output portion of clamp arm 14
16 cylinder hole
18 piston
20 working chamber
22 first hole
24 through hole
24a second hole
24b female screw hole
26 return spring
28 pressing bolt
C1 axis of cylinder hole 16
C2 axis of first hole 22
θ inclination angle

The invention claimed is:

1. A clamp device comprising:
a clamp arm extending along a housing in a horizontal direction, the clamp arm including a fulcrum portion which is swingably supported by the housing at a middle portion in the horizontal direction, an input portion which is provided at a base end thereof in the horizontal direction, and an output portion which is provided at a leading end thereof in the horizontal direction;
a cylinder hole formed in the housing and below the input portion so as to extend in an up-down direction and be opened in an upper surface of the housing;
a piston inserted into the cylinder hole, the piston being configured to advance to above an opening end of the housing to move the input portion upward;
a working chamber which is formed between a bottom wall of the cylinder hole and the piston and which a pressure fluid is supplied into and discharged from;
a first hole formed near a leading end portion of the housing so as to be opened obliquely upward toward a leading end-adjacent portion of the clamp arm;
a through hole formed between the output portion and the fulcrum portion so as to extend obliquely upward and provide communication between an upper surface and a lower surface of the clamp arm, the through hole including a second hole and a female screw hole which are formed so as to extend upward;
a return spring mounted in the first hole and the second hole and configured to bias the output portion upward, wherein a spring receiver is provided in the second hole that is configured to engage an upper end portion of the return spring; and a pressing bolt screwed into the female screw hole from above that engages the spring receiver to compress the return spring, wherein the female screw hole has an upper part formed as a counter bore and a lower part having threads that match threads of the pressing bolt, wherein an inner diameter of the second hole is larger than an inner diameter of the female screw hole.

2. The clamp device according to claim 1, wherein
at least an upper half portion of the cylinder hole is formed so as to extend straight in the up-down direction; and
at least an upper half portion of the piston is formed so as to extend straight in the up-down direction.

3. The clamp device according to claim 2, wherein an inclination angle of an axis of the first hole with respect to an axis of the cylinder hole is set within a range of 30 degrees to 45 degrees.

4. The clamp device according to claim 1, wherein an inclination angle of an axis of the first hole with respect to an axis of the cylinder hole is set within a range of 30 degrees to 45 degrees.

5. The clamp device according to claim 4, wherein the inclination angle is set within a range of 35 degrees to 45 degrees.

6. The clamp device according to claim 1, wherein said clamp device is mounted on a support stand.

* * * * *